No. 755,505. PATENTED MAR. 22, 1904.
M. J. LAWLER.
GEARING.
APPLICATION FILED JUNE 6, 1903.
NO MODEL.
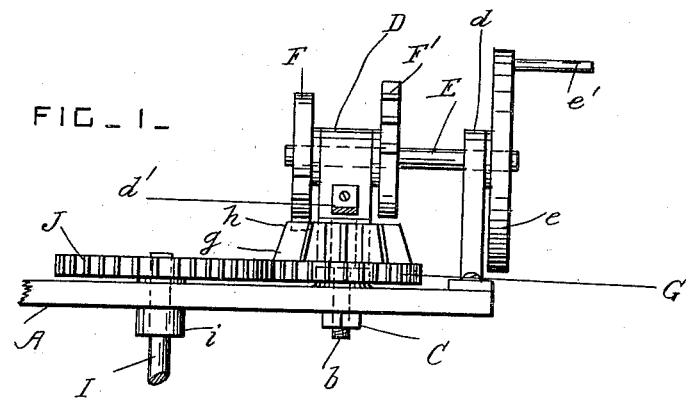
FIG. 1.
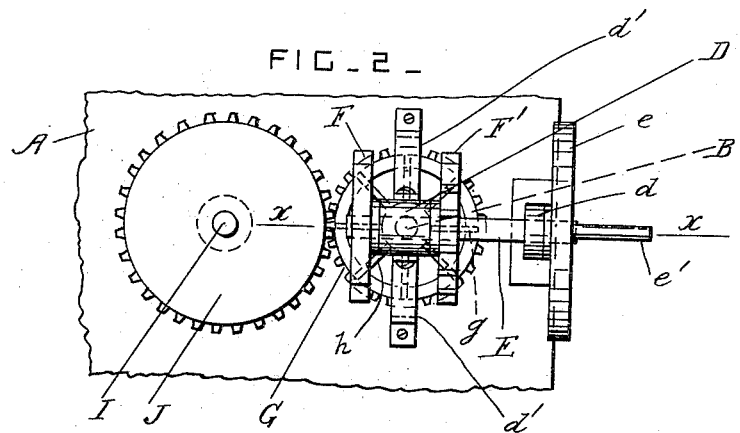
FIG. 2.
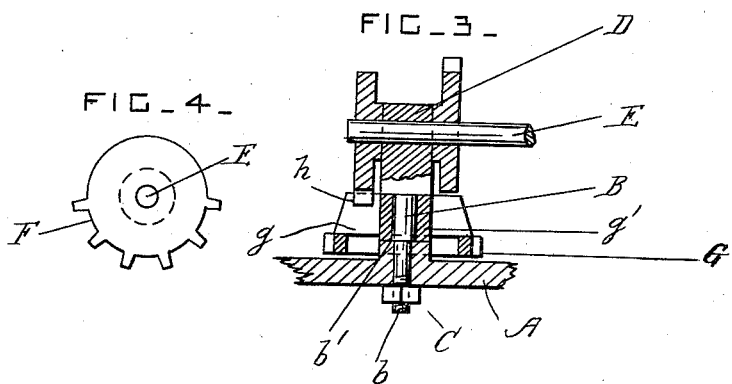
FIG. 3.
FIG. 4.
WITNESSES
Walter Allen
Wm. L. Morris
INVENTOR
Miles J. Lawler.
by Herbert W. T. Jenner.
Attorney No. 755,505.

Patented March 22, 1904.

UNITED STATES PATENT OFFICE.

MILES J. LAWLER, OF PARNELL, IOWA.

GEARING.

SPECIFICATION forming part of Letters Patent No. 755,505, dated March 22, 1904.

Application filed June 6, 1903. Serial No. 160,336. (No model.)

*To all whom it may concern:*

Be it known that I, MILES J. LAWLER, a citizen of the United States, residing at Parnell, in the county of Iowa and State of Iowa, have invented certain new and useful Improvements in Gearing; and I do hereby declare the following to be a full, clear, and exact description of the invention, such as will enable others skilled in the art to which it appertains to make and use the same.

This invention relates to gearing for converting continuous rotary motion into reciprocating rotary motion; and it consists in the novel construction and combination of the parts hereinafter fully described and claimed.

In the drawings, Figure 1 is a side view of the gearing. Fig. 2 is a plan view of the gearing. Fig. 3 is a vertical section taken on the line $x\ x$ in Fig. 2. Fig. 4 is a detail view of one of the toothed segments.

A is a base-plate or supporting-plate, and B is a vertical shaft, which is stationary. The lower part $b$ of the shaft is provided with a shoulder $b'$, which rests on the plate A. The part $b$ is arranged in a hole in the plate A, and C is a nut on the under side of the plate, which is screwed on the lower projecting end portion of the part $b$, so that the shaft B is secured in position.

D is a bearing at the upper end of the shaft B. This bearing is formed integral with the shaft, or it is otherwise rigidly secured to it. Stays $d'$ are also provided between the bearing D and the plate A.

E is the driving-shaft, which is journaled in the bearing D and in an auxiliary bearing $d$, which is secured to the plate A. The shaft E is provided with a driving-wheel $e$, having a crank-handle $e'$, and the shaft may be driven by hand or by power, as desired.

F F' are two similar toothed segments, which are secured upon the driving-shaft E, one on each side of the bearing D. These segments are secured so that their toothed portions project in opposite directions and so that the two segments when taken together are like a toothed wheel.

G is a toothed-wheel rim provided with radial arms $g$ on one side and a hub $g'$. The hub $g'$ is journaled on the shaft B, and the upper parts or edges of the arms $g$ form wheel-teeth $h$, with which the toothed segments F F' engage alternately as the driving-shaft is revolved.

I is a shaft journaled in a bearing $i$ on the plate A parallel with the shaft B, and J is a toothed wheel which is secured upon the shaft I.

When the shaft E is revolved continuously, the segments engage alternately with the teeth $h$ and the wheel G is revolved first in one direction and then in the reverse direction, and it transmits its motion to the wheel J and shaft I. The shaft I is used to drive an agitator or other device which requires to be oscillated or driven first in one direction and then in the other direction.

What I claim is—

1. The combination, with a supporting-plate, a stationary supporting-shaft having a bearing at one end, and means for rigidly securing the other end of the said shaft to the said plate; of a driving-shaft journaled in the said bearing, two toothed segments secured on the said driving-shaft, one on each side of the said bearing, and a toothed wheel journaled on the said stationary shaft between the said plate and bearing and gearing with the said toothed wheels alternately.

2. The combination, with a driving-wheel rim provided with a hub and radial arms which have wheel-teeth between the said rim and hub and at their edges, of two toothed segments which gear into the said wheel-teeth alternately, and means for revolving the said segments simultaneously.

In testimony whereof I affix my signature in presence of two witnesses.

MILES J. LAWLER.

Witnesses:
M. HANNON,
JAMES M. WOODS.